July 8, 1958 J. P. ECKERT, JR., ET AL 2,842,663

COMPARATOR

Filed June 10, 1955 5 Sheets-Sheet 1

*INVENTORS*
J. PRESPER ECKERT, JR.
A. W. REICKORD

BY Charles G. English
AGENT

July 8, 1958 J. P. ECKERT, JR., ET AL 2,842,663

COMPARATOR

Filed June 10, 1955 5 Sheets-Sheet 2

INVENTORS
J. PRESPER ECKERT, JR.
A. W. REICKORD

BY Charles G. English
AGENT

COMPARATOR

Filed June 10, 1955 5 Sheets-Sheet 3

INVENTORS
J. PRESPER ECKERT, JR.
A.W. REICKORD
BY Charles C. English
AGENT

July 8, 1958 J. P. ECKERT, JR., ET AL 2,842,663

COMPARATOR

Filed June 10, 1955 5 Sheets-Sheet 4

INVENTORS
J. PRESPER ECKERT, JR.
A. W. REICKORD

BY Charles C. English
AGENT

July 8, 1958 J. P. ECKERT, JR., ET AL 2,842,663

COMPARATOR

Filed June 10, 1955 5 Sheets-Sheet 5

INVENTORS
J. PRESPER ECKERT, JR.
A. W. REICKORD
BY Charles C. English
AGENT

United States Patent Office 2,842,663

Patented July 8, 1958

2,842,663

COMPARATOR

John Presper Eckert, Jr., Gladwyne, and Adelbert W. Reickord, Drexel Hill, Pa., assignors, by mesne assignments, to Sperry Rand Corporation, New York, N. Y., a corporation of Delaware Application June 10, 1955, Serial No. 514,629

19 Claims. (Cl. 250—27)

This invention relates in general to electrical pulse signal coincidence detectors and in particular to circuits for comparing and indicating coincidence of a pair or more of binary coded signals.

In the field of electronics, and in the digital computer art in particular, it frequently occurs that a continuously varying binary pulse code periodically generated at one point in an apparatus must be compared with a binary code being generated or stored at another point in the apparatus. This may be especially the case if a print drum or cylinder carrying a plurality of identical peripheral rows of type characters with the identical type characters in each row being (generally speaking) substantially aligned axially is continuously rotated at a high speed. Each of the type characters in the several rows is represented by a different binary code which is generated in synchronism with the rotation of the drum by an associated code generator.

As the type characters on the drum arrive at a point opposite the print hammers, the code generator generates a binary code representing the type character to be printed. This simultaneously generated pulse code is then compared with the binary information stored in a plurality of memory circuits, one memory circuit for each print hammer. If correspondence is found between the code being generated in the code generator and any of the print hammer memory circuits, the corresponding print hammers are actuated and a type imprint is made on the paper.

In many instances it might be advantageous to find out through electronic means (*a*) whether or not signals or information data are present in any specific memory location, and (*b*), if any signals or information data are present, what the specific characteristics of these signals or information data are. Such electronic means would have to perform two functions, therefore: one function would consist in a "yes or no" probe; the other, in the case of "yes," would consist in a "detailed answer" probe. It could be assumed, in most cases, that the output signals resulting from the "detailed answer" probe would continue to represent information data, while the output signals derived from the "yes or no" probe may be used either as separate information entries or as control signals.

The present invention provides a device which not only performs these two functions, but wherein one single circuit performs the double function of the "yes or no" probe and of the "detailed answer" probe, and wherein one single output line carries the signals resulting from either probe.

It is, therefore, an object of this invention to provide a novel comparator circuit for indicating coincidence between a pair of relatively changing binary codes.

It is another object of this invention to provide a novel comparator for indicating the correspondence between the changing code generated by a binary code generator and a binary code stored in a memory circuit.

It is another object of this invention to provide an electronic device which performs the double function of sensing whether there is any stored information in the memory and, if so, what kind of information is stored.

It is, furthermore, a more specific object of this invention to provide an electronic device which performs the double function of sensing whether at least one electronic unit in a plurality of such units is in a certain predetermined state and, if so, in which state every individual unit in such plurality is and its exact position within that plurality.

It is another object to provide one single output circuit responsive to either form of the above-described probes.

It is a further object of this invention to provide an electronic device which may be used to separate more general information from relatively more specific information.

It is again another object of this invention to provide electronic decoding, encoding or translating means.

Other objects and advantages of this invention will become apparent from the following description and the accompanying drawings. Any values indicated in the description and drawings in regard to potentials, resistors etc. are given only as an example to assist in the understanding of the particular form to which the present invention has been applied for the purpose of explanation. These values may be varied, of course, to meet the specific requirements of various applications without departing essentially from the teachings of this invention.

Figure 1 presents in form of a block diagram an example of an arrangement within which the present invention may be used;

Figure 2 gives a partial schematic diagram of a probing circuit in accordance with the invention and its connections both to some memory units and to a code generator;

Figures 3 to 7 inclusive illustrate the operation of the probing circuit of Figure 2 under varying conditions, namely Figure 3 explains the operation during the "yes or no" probe when the answer is to be "no";

Figure 7:
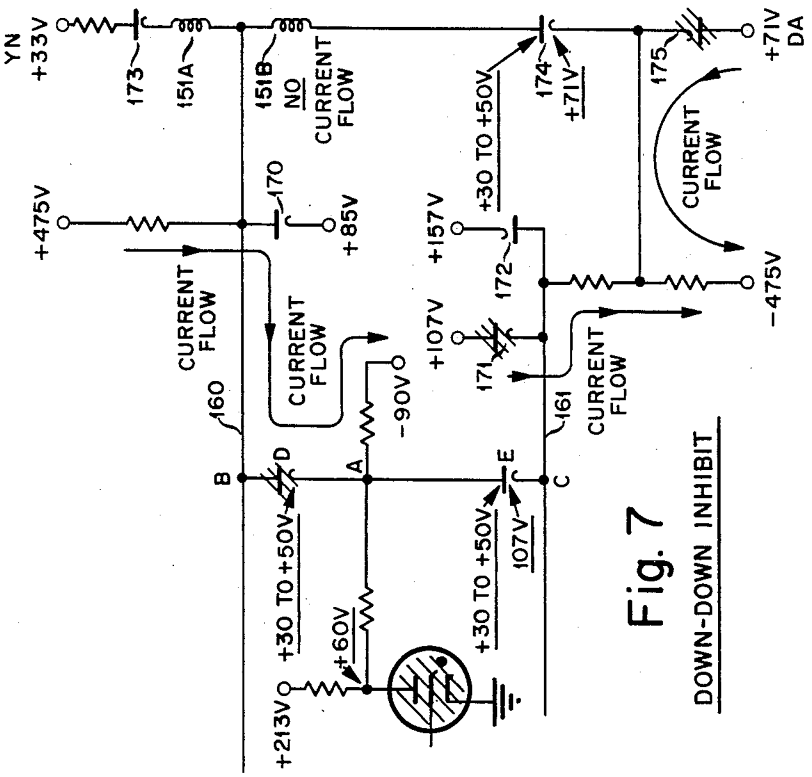
Figure 6:
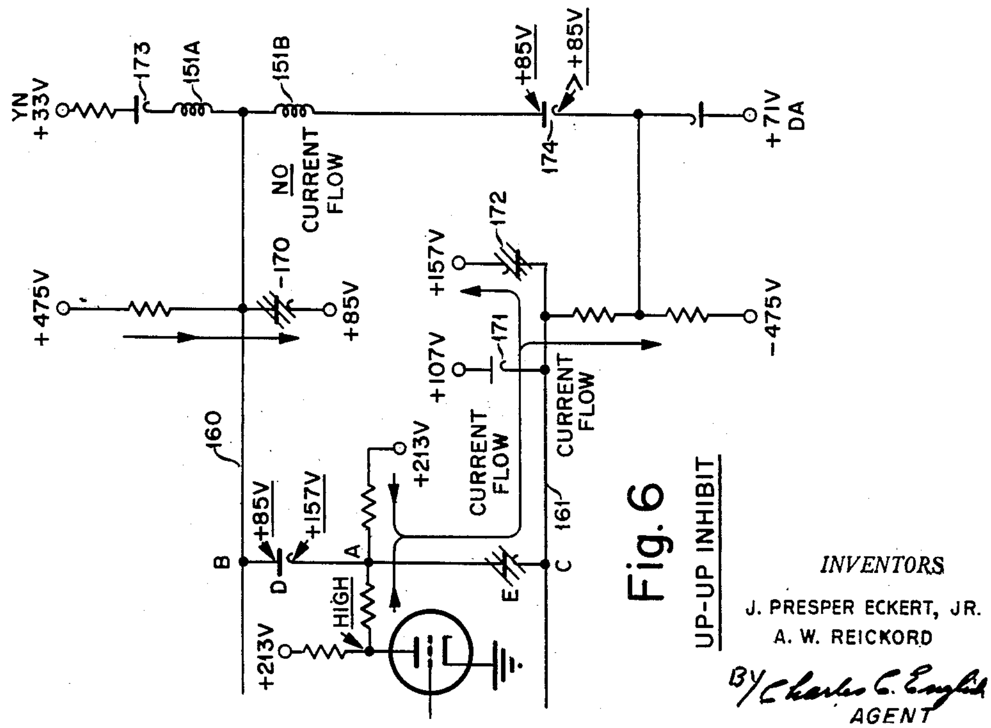

Figure 6 explains the operation during the latter probe when there is a first case of discrepancy between the information stored in one individual memory unit and the specific signal from the code generator which is directed towards that individual unit; and Figure 7 shows the operation during the same probe when there is a second case of such a discrepancy.

Figure 1:
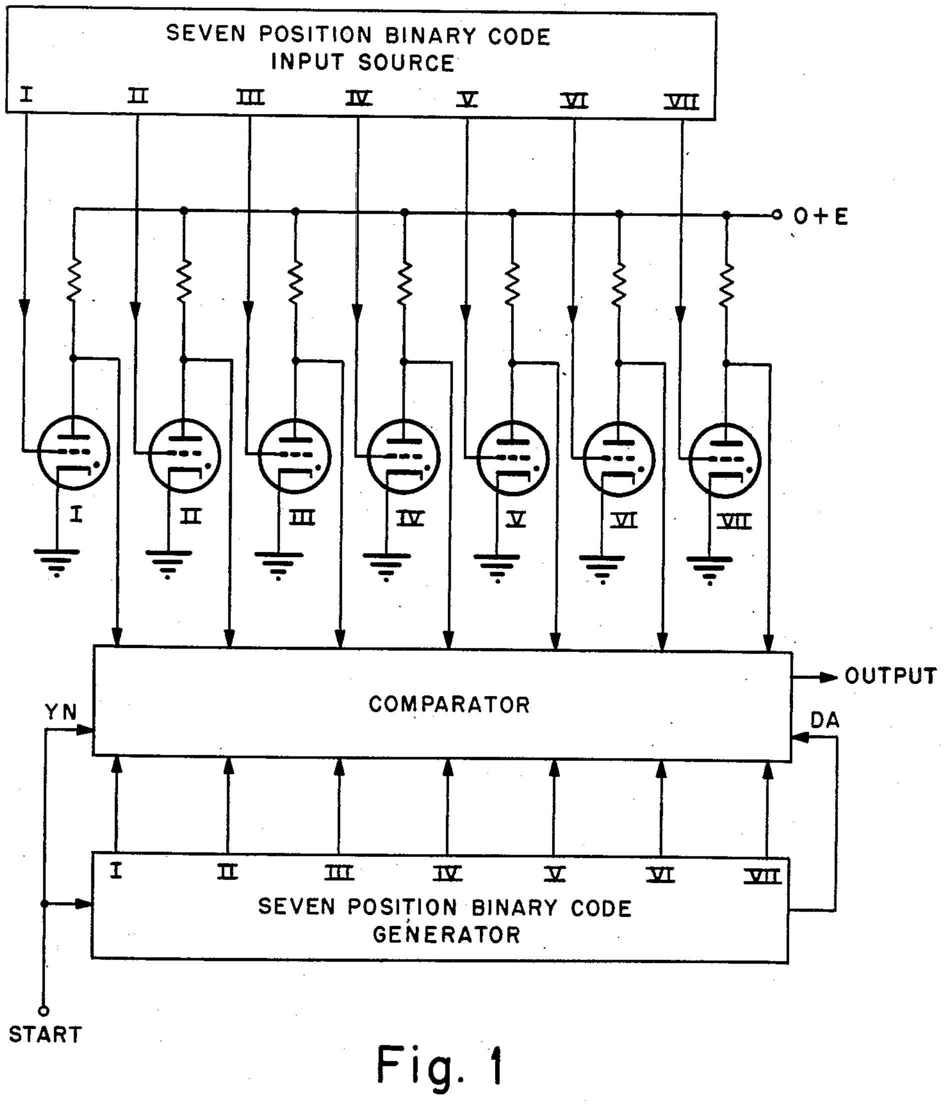

The drawings illustrate, by way of example, a device wherein one and the same circuit performs the two independent functions of a "yes or no" probe and of a "detailed answer" probe. Figure 1 presents in form of a block diagram a simplified sample arrangement within which the comparator of the present invention may be put into operation. It shows on its top a block labeled "Seven Position Binary Code Input Source." Any of the many information input devices known in the art may serve as the input source. In a specific case, a multiple-channel electromagnetic transducer performed this function. It is assumed, for the purpose of illustration, that the code referred to is a so-called binary code. This means that the code combination consists exclusively of selective combinations of "zeros" and "ones" because there are no other figures available in the binary system. The presence of a signal may then be interpreted as a "one," and the absence of a signal may be interpreted as a "zero," or vice versa. It is assumed, furthermore, for the purpose of illustration, that there are seven positions in the code to be applied. In accordance with this assumption, seven lines labeled I to VII inclusive are illustrated in Figure 1 which connect the input source individually to the grids of seven memory tubes, also labeled I to VII. The drawing indicates that thyratrons may be used as memory units. Each thyratron is allocated to one of the seven assumed code positions, and all seven thyratrons taken collectively make up one memory location or line.

Storage devices are customarily set up in such manner that they contain a plurality of memory lines which are sometimes also called address lines. This means that the memory is capable of storing more than one code combination at a time, one in each memory location. It is entirely immaterial, for the purposes of this disclosure, whether or not the memory contains more than one address line because the present invention provides an individual probing circuit for every individual address line. In the specific case, supra, the memory contained 120 address lines, and this machine comprised, therefore, 120 comparator circuits.

Turning back now to Figure 1, the drawing shows that each thyratron is individually connected from its anode to the block called "Comparator" in the center of the drawing. The bottom section of Figure 1 contains a block called "Seven Position Binary Code Generator." Here again reference may be made to any of the many devices known in the art which can periodically produce all the different coded pulse combinations as may be stored in the memory circuit. In accordance with the assumptions made hereinabove, seven lines labeled I to VII inclusive leave the code generator each of which is provided for one of the seven code positions, as assumed, and each of which enters the comparator at a point which is opposite to the point of entrance of the connecting line coming from the memory tube for the corresponding code position.

Figure 1 shows on its lower left side an input terminal called "Start" and a connection from this terminal to both the code generator and the comparator. This indicates, as will be explained in more detail hereinafter, that the "Start" signal pulse which puts the code generator into operation is simultaneously applied as a "yes or no" or "YN" signal to the comparator. Thus the "YN" signal pulse is only once applied at the start of a cycle of pulse codes sequentially produced by the code generator. At the end of a cycle of codes the generator stops its output and awaits the arrival of the next start pulse. In other words, the code generator is started upon receipt of the start pulse, and then it generates in sequence all the codes desired to be stored in the memory and stops.

Figure 1 shows on its right side a connection which carries the "detailed answer" or "DA" signal from the code generator to the comparator. This "DA" signal is a periodic signal and is applied whenever a coded pulse combination arrives at the comparator from the code generator. More details will be explained hereinafter.

Figure 2:
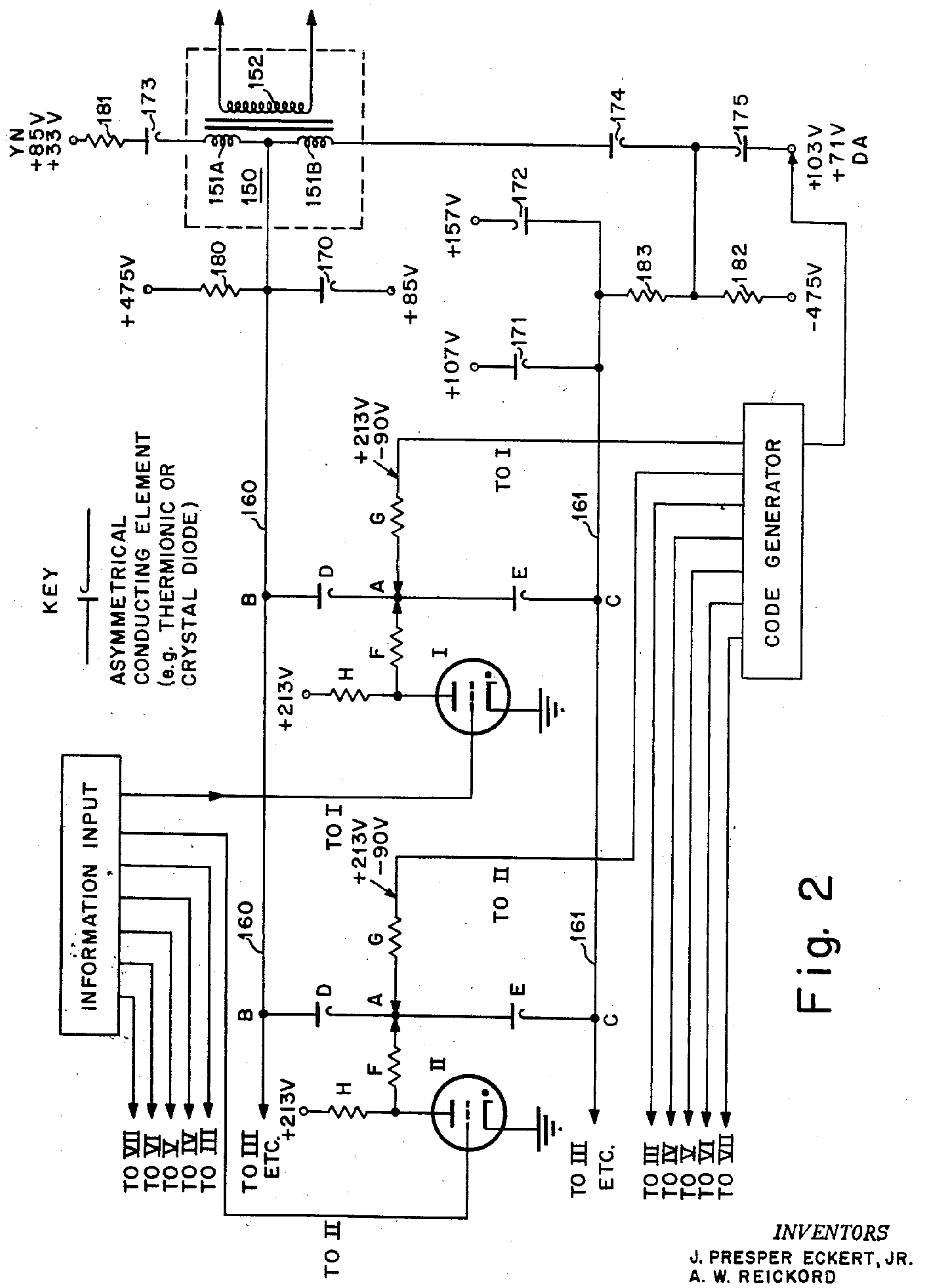

Figure 2 gives a schematic diagram of the comparator circuit. For reasons of simplification, only two of the seven memory tubes are shown, namely thyratrons I and II, each of which is connected as hereinafter described to a pair of common lines 160 and 161. It is indicated, however, that the left side endings of lines 160 and 161 lead to the thyratrons III to VII which are not shown. The cathodes of the thyratrons are connected to ground. The grid of each thyratron is individually connected to the specific information input line the code position of which corresponds to the code position of the respective thyratron. The anodes of the thyratrons are connected through separate resistors H to a common voltage source which supplies plus 213 volts, in the given example.

Each thyratron has its anode connected through a respective resistor F to a separate point A. The A point of each code position in the comparator is connected through a respective resistor G to a respective output terminal of the code generator. Point A is not only the junction point between the anode of its correlated thyratron and the corresponding output line from the code generator, but it is also the junction point of two asymmetrical conductors D and E. The drawing indicates that each set of memory tube and code generator output lines has its own pair of asymmetrical conductors D and E. Each diode D is connected at its cathode to point A and at its anode to a point B on common line 160. Each diode E is connected at its anode to point A and at its cathode to a point C on common line 161. It goes without saying that there are as many points B and C as there are points A or positions in the code being utilized. The aforementioned line 160 connects all the points B to the output device of the circuit which, in the given example, is a transformer 150, the primary of which is center tapped. The center tap divides this primary into a section 151A and another section 151B. Line 160 is connected to the center tap. The aforementioned line 161 connects all the points C to that terminal of the primary section 151B which is not connected to the center tap. The output from the transformer 150 emanates from the secondary 152.

The terminal of the primary section 151A which is not connected to the center tap is connected to the cathode of an asymmetrical conductor 173. The anode of this diode is connected through a resistor 181 to the signal input terminal YN. The terminal of the binary section 151B which is not connected to the center tap is connected to the anode of the asymmetrical conductor 174. The cathode of the asymmetrical conductor 174 is connected to the cathode of the asymmetrical conductor 175. The anode of the asymmetrical conductor 175 is connected to the signal input terminal DA.

The junction of asymmetrical conductors 174 and 175 is connected through a resistor 183 to the above-mentioned line 161. This junction is also connected through resistor 182 to a power supply source which, in the given example, is minus 475 volts. Similarly, a positive power supply source which, in the given example, is plus 475 volts is connected through a resistor 180 to line 160.

There is one clamping device connected to line 160 while there are two clamping devices associated with line 161. The anode of the asymmetrical conductor 170 is connected to line 160, and its cathode is connected to a voltage source of plus 85 volts. As a result, the voltage on line 160 can never exceed plus 85 volts. The cathode of the asymmetrical conductor 171 is connected to line 161, and its anode is connected to a voltage source of plus 107 volts. As a result, the voltage on line 161 can never drop below plus 107 volts. The anode of the asymmetrical conductor 172 is connected to line 161, and its cathode is connected to a voltage source of plus 157 volts. As a result, the voltage on line 161 can never go above plus 157 volts.

In a preferred embodiment of the invention the following resistor values have been used: for resistor H: 39K; for resistor F: 22K; for resistor G: 100K; for resistor 180: 850K; for resistor 181: 4.7K; for resistor 183: 50K; and for resistor 182: 530K.

Turning now to the functions of the asymmetrical conductors D, E, 173, 174 and 175, the purpose of diode D is to permit any conduction between points A and B only if and when the voltage at point A is lower than the voltage of point B. Asymmetrical conductor E conducts only if and when the voltage at point A is higher than the voltage at point C. Asymmetrical conductor 173 conducts only when the voltage on line 160 is below the voltage applied to the YN terminal. Asymmetrical conductor 174 conducts only if and when the voltage on line 160 is higher than the potential on its cathode. Similarly, asymmetrical conductor 175 conducts only if and when the potential on its cathode is lower than its voltage coming from the signal input DA. As to the input signal YN which stands for the "yes or no" probe signal, this signal which is a momentary pulse is taken from the leading edge of the start signal referred to in connection with Figure 1. In the preferred embodiment of the invention, the YN signal rises during its existence to an amplitude of plus 85 volts from a base line voltage of plus 33 volts. The DA signal, which is a recurring pulse signal and which stands for "detailed answer" probe signal, is generated by the code generator. This signal is produced simultaneously with every code combination which is to be transmitted from the code generator. In the preferred embodiment of the invention, the DA signal falls from a plus 103 volt base line to an amplitude of plus 71 volts in synchronism with the production of the coded pulse output of the code generator. It may be stressed, in this connection, that during the "yes or no" probe no code signals are transmitted from the code generator. There is, therefore, no DA signal at this time, and the voltage at the DA input terminal remains at base line value of plus 103 volts.

Turning now to the output voltages which may emanate both from any of the memory tubes and from its associated output line from the code generator, the following voltages may be effective at the respective point A. It is assumed, in this example, that the ignition of a thyratron by an appropriate binary signal emanating from the Seven Position Binary Code Input Source represents a binary "one," and also that a binary "one" signal on any one of the output lines from the code generator is represented on that particular output line by the application of plus 213 volts. It is also assumed that the base line voltage on any one of the output lines from the code generator is minus 90 volts, except in the case when a binary "one" is to be signalled. This means that the output voltage from the code generator stays at minus 90 volts during the "yes or no" probe since the YN signal arrives at the time when no coded pulse combination has yet been produced by the code generator. This was already explained in connection with Figure 1, and also in connection with the YN signal hereinabove when it was stated that the YN signal represents the leading edge of the start signal which puts the code generator into operation. It also means that the voltage emanating from each code output line of the code generator remains at minus 90 volts, if and when a binary "zero" is to be transmitted on the respective output lines from the generator.

Figure 4:
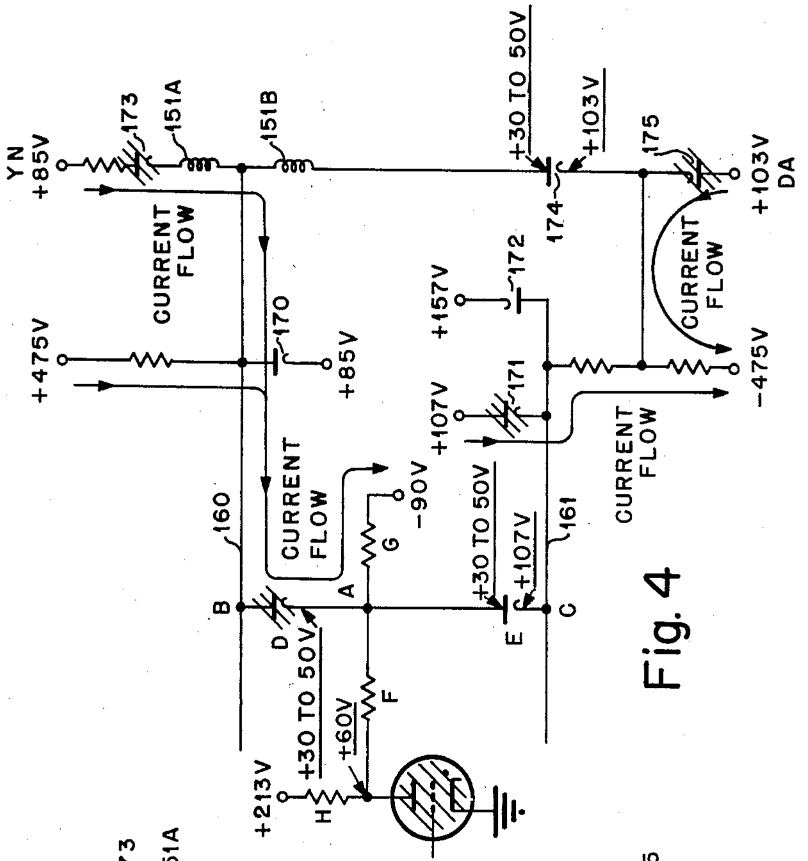
Figure 4 shows the operation during the same probe when the answer is to be "yes"
Figure 3:
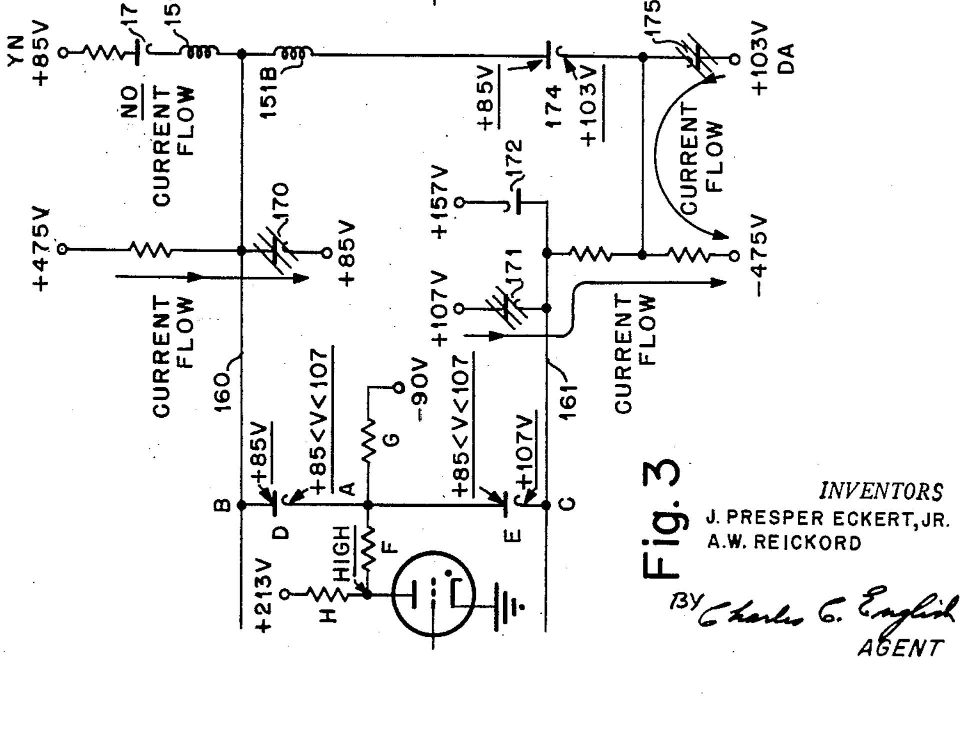
Figure 5:
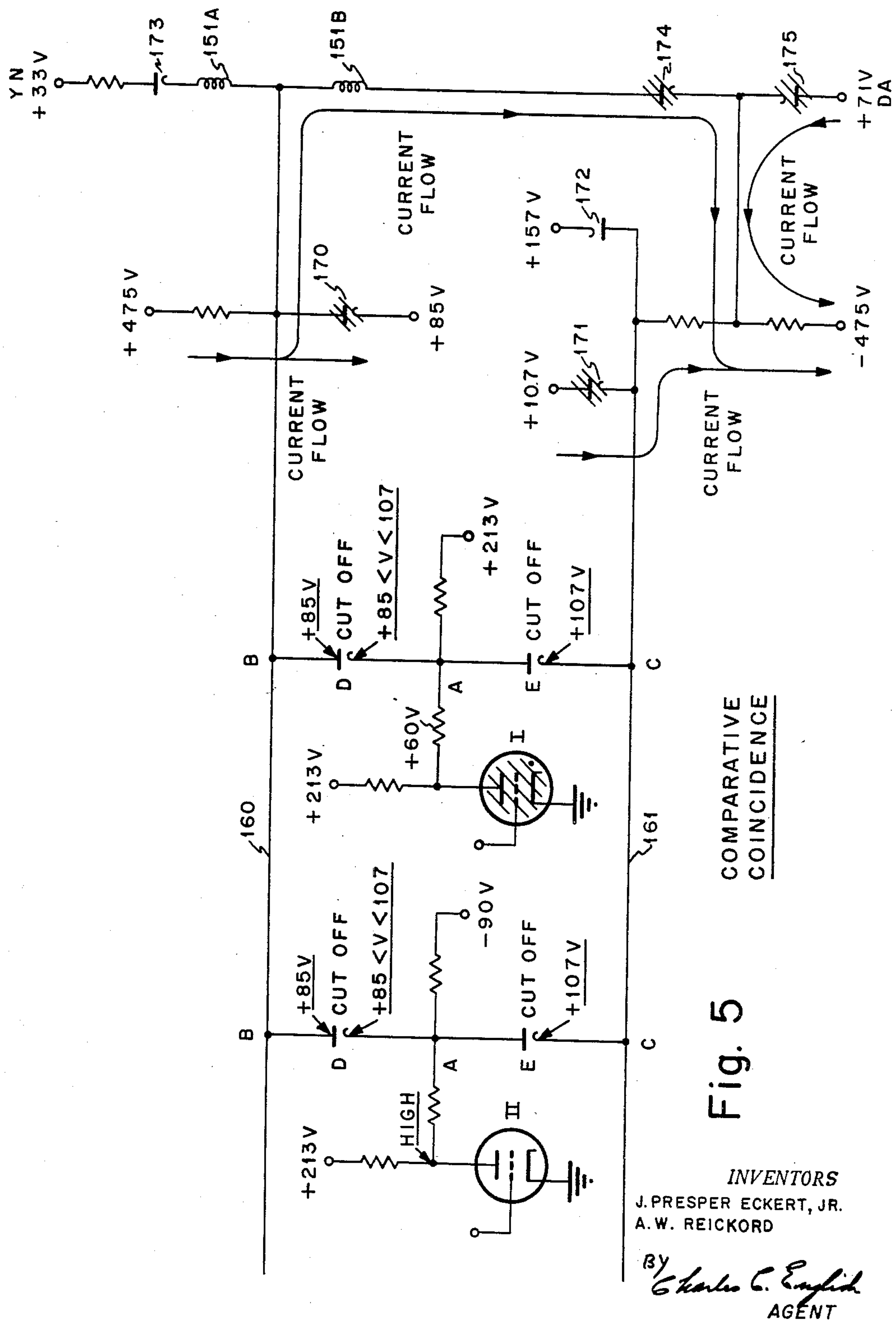
Figure 5 illustrates the operation during the "detailed answer" probe when the code combination stored in the probed section of the memory corresponds to the code combination emanating from the code generator.

Having described the elements of the circuit shown in Figure 2, attention may be given now to the variations in operating conditions which are illustrated in Figures 3 to 7. Figures 3 and 4 show the two essential variations in the operation of the circuit of Figure 2 during the "yes or no" probe. Figures 5, 6 and 7 show the significant changes in operating conditions which may occur during the "detailed answer" probe.

Figure 3 illustrates only one memory tube. It is assumed in this case that no information has been stored in the memory circuit and that each of the memory tubes stores a "zero" and is, therefore, not ignited (the effect would be essentially the same if every one of the seven memory tubes would store a "zero"). The anode potential is relatively high since the tube is not conducting. At the same time, the voltage arriving on the corresponding output line from the code generator is at minus 90 volts. It was explained hereinabove that the output voltage of the code generator remains at its base line amplitude during the "yes or no" probe. It was also stated hereinabove that the YN signal consists in the application of a plus 85 volts pulse while the DA signal remains at its base line amplitude of plus 103 volts. During this condition the voltage at the point A is greater than 85 volts but less than 107 volts, and diodes D and E are both cut off. As a result, the following effects take place: Looking first at line 160 and its associated connections, there is a current flow from plus 475 volts through asymmetrical conductor 170 to plus 85 volts. The clamping effect of the asymmetrical conductor 170 and its associated voltage source limits the voltage on line 160 to plus 85 volts. This, in turn, gives the cathode of asymmetrical conductor 173 a higher voltage than its anode which receives only the voltage of the YN signal of plus 85 volts reduced by the resistor. The asymmetrical conductor 173 is, therefore, cut off, and no current flows through the primary section 151A of the transformer as a result of the YN signal. Accordingly, no output signal emanates from the secondary 152.

Looking now at line 161, the following situation may be noted: There is a current flow from plus 107 volts through asymmetrical conductor 171 to minus 475 volts. The clamping effect of the asymmetrical conductor 171 and its associated voltage source puts line 161 at plus 107 volts. There is also a current flow from the DA signal input which stays during the "yes or no" probe at plus 103 volts to the power input source of minus 475 volts. As a result, the cathode of asymmetrical conductor 174 is at plus 103 volts, in contrast to the voltage at its anode which, due to the condition of line 160, is at plus 85 volts. As a result, the asymmetrical conductor 174 is cut off, and no current flows through the primary section 151B of the transformer.

As to the asymmetrical conductor D, line 160 transmits to its anode a voltage of plus 85 volts. The voltage at point A when the gas tube is blocked is larger than plus 85 volts. The asymmetrical conductor D is, therefore, cut off. Line 161 transmits a voltage of plus 107 volts to the cathode of asymmetrical conductor E. The voltage at point A under the conditions assumed and with the parameters used in smaller than plus 107 volts. Accordingly, asymmetrical conductor E is cut off.

The result that was obtained may be generalized as follows: If, during the "yes or no" probe, none of the memory tubes at a given memory location stores a binary "one" or, in other words, if none of the memory tubes is ignited during the "yes or no" probe, there is no current flow either through the primary section 151A or through the primary section 151B. As a result, no output signal emanates from the secondary 152.

The operation of the circuit of Figure 2 during the "yes or no" probe will now be discussed with the assumption that at least one of the memory tubes is storing a binary "one." This means that at least one of the seven tubes is ignited. Otherwise, the input voltages remain the same as in the case of Figure 3.

Figure 4 illustrates the operation of the comparator circuit during the "yes or no" probe, if and when at least one memory tube is conducting. As a result of its conduction, the anode voltage of the memory tube drops to about plus 60 volts. This comparatively low anode potential, in conjunction with the base line voltage of minus 90 volts on the corresponding output line from the code generator, results in a voltage at point A which is somewhere between plus 30 and plus 50 volts. This means that the voltage at the cathode of the asymmetrical conductor D is lower than plus 85 volts. Accordingly, the asymmetrical conductor D conducts, and there is a current flow from plus 475 volts through the asymmetrical conductor D and point A to the minus 90 volts of the code generator.

Conduction in diode D clamps the voltage on line 160 to the potential at point A. Thus, due to the conduction of asymmetrical conductor D, the voltage on line 160 drops to between plus 30 and plus 50 volts, which, in turn, puts the cathode potential of asymmetrical conductor 173 below the anode potential during the YN pulse. The asymmetrical conductor 173 conducts, therefore, and current flows from plus 85 volts through the asymmetrical conductor 173 and through the primary section 151A of the transformer into line 160. The current flow through the primary section 151A induces an output signal in the secondary 152 which is the "yes" output signal of the circuit.

The output signal during the "yes or no" probe is brought about exclusively through the operation of the primary section 151A. There is, under the given conditions, no current flow through the primary section 151B. The current flows through line 161 and its associated connections remain the same in the case of Figure 4 as in the case of Figure 3. There is a current flow from plus 107 volts through asymmetrical conductor 171 to minus 475 volts. There is also a current flow from the DA input terminal which is at its base line voltage of plus 103 volts to the power input of minus 475 volts.

The asymmetrical conductor 174 still remains cut off, as in the case of Figure 3. Its cathode shows a voltage of plus 103 volts while its anode, due to the conduction of the asymmetrical conductor D, has only a potential of between plus 30 and plus 50 volts. No current flows, therefore, through the primary section 151B.

The effects of the operation illustrated in Figure 4 can be generalized as follows: If, during the "yes or no" probe, at least one of the memory tubes stores a binary "one" or if, in other words, at least one of the seven memory tubes is ignited during the "yes or no" probe, an output signal from the secondary 152 results, due to the operation of the primary section 151A.

Turning now to the varying conditions in the case of the "detailed answer" probe, Figure 5 illustrates the operation of the circuit shown in Figure 2, if and when there is a comparative coincidence. The term "comparative coincidence" is used to indicate that the coded signal combination which is stored in the seven memory tubes is identical with the coded pulse combination emanating at this time from the code generator. This means that, if a specific output line from the code generator carries the signal for a binary "one," its associated memory tube stores also a binary "one" and is, therefore, ignited. It also means, of course, that, if a specific output line from the code generator carries no specific signal and remains at its base line voltage, this represents a binary "zero," while the associated memory tube is not ignited, which similarly indicates a binary "zero." Looking now at the different input voltages applied under the given circumstances, the following facts are to be noted: If the memory tube stores a binary "one," and if its associated output line from the code generator signals also a binary "one," the tube conducts, and its anode potential is, therefore, at about plus 60 volts, while the signal from the code generator consists in the application of plus 213 volts. If, to take the other possibility, the memory tube stores a binary "zero" and is, therefore, not ignited, its anode voltage is high, due to the lack of conduction, while the corresponding output line from the code generator is at its base line voltage of minus 90 volts. Both cases have one common characteristic: If one of the two elements (anode of the thyratron memory or associated output line of code generator) shows a low potential, the other one shows a high potential, and it does not make any difference, for the purposes of this probe, whether it is the anode of the memory tube or the output line from the code generator which carries the high potential or vice versa. In other words, in the case of a binary "one" the anode potential of the memory tube is low or "down" and the potential in the corresponding output line from the code generator is relatively high or "up." In the case of a binary "zero" the anode potential of the memory tube is relatively high or "up," while the potential in the corresponding output line from the code generator is comparatively low or "down." In either case the potentials at all the A points is greater than 85 volts but less than 107 volts and both diodes D and E are cut off. The effects of these conditions on the circuit of Figure 2 will now be described in detail.

As indicated in Figure 5, there is no YN signal input during the "detailed answer" probe. The voltage at YN remains, therefore, at its base line amplitude of plus 33 volts. In contrast thereto, there is a DA signal input which means that, with every coded pulse combination arriving from the code generator, a momentary DA signal is supplied at the DA signal input terminal. This signal is periodic during the operation of the code generator and consists in the application of plus 71 volts, in contrast to a base line voltage of plus 103 volts.

Figure 5 shows only two of the seven memory tubes, which suffices for the purpose of illustration. To show the possible two variations in the operation it is assumed that memory tube I stores a binary "one" and is, therefore, ignited, while memory tube II stores a binary "zero" and is, therefore, not conducting. During this condition the potential at each A point is greater than 85 volts but less than 107 volts. Thus, none of the diodes D or E connecting the points A to lines 160 and 161 are conducting. Turning first to line 160 and its associated connections, there is a current flow from plus 475 volts through the asymmetrical conductor 170 to plus 85 volts, thus putting the line 160 at plus 85 volts. As a result, the anode of asymmetrical conductor 174 is also at plus 85 volts. The cathode of asymmetrical conductor 174 is, however, at plus 71 volts, due to the current flow from plus 71 volts through asymmetrical conductor 175 to minus 475 volts. As a result, asymmetrical conductor 174 conducts, and the current from plus 475 volts not only flows to plus 85 volts, but flows also through the primary section 151B and the asymmetrical conductor 174 to minus 475 volts. This current flow through the primary section 151B induces an output signal in the secondary 152 which indicates that there is a comparative coincidence between the code combination stored in the memory and the code combination signalled by the code generator.

Turning now to the other sections of the circuit, Figure 5 indicates also a current flow from plus 107 volts through asymmetrical conductor 171 and through line 161 to minus 475 volts, thus putting line 161 at plus 107 volts. It should be remembered in this connection that line 160 is at plus 85 volts. As a result of these conditions, the asymmetrical conductors D and E for memory tube I and the corresponding asymmetrical conductors for memory tube II are cut off. Both in the circuits of memory tube I and memory tube II the voltage at their respective points A is, for all practical purposes, the same. The voltage at either point A is larger than plus 85 volts and smaller than plus 107 volts. None of the four asymmetrical conductors can conduct because all four cathodes show a higher potential than their respective anodes.

The conditions for the operation in the case of comparative coincidence, as illustrated in Figure 5, may be generalized as follows: If there is a comparative coincidence between the code combination stored in the memory tubes and the code combination signalled from the code generator, the memory and the code generator circuits are cut off from the remainder of the comparator circuit. As a result of this "non-interference" by the memory and code generator circuits, a comparative coincidence output signal emanates from the secondary 152 as a result of the operation of the primary section 151B.

In order to be complete it may be stated that, under the given conditions, there cannot be a current flow through the primary section 151A because the voltage of plus 85 volts on line 160 is higher than the 33 volt voltage applied to the anode of asymmetrical conductor 173, during the "detailed answer" probe.

It can be deduced, for strictly logical reasons, that if a comparative coincidence results in a non-interference of the memory and code generator circuits with the operation of the remainder of the comparator circuit that the opposite must be true in the case of a disagreement between the code combination stored in the memory and the code combination signalled from the code generator. Such a disagreement effects an interference with the operation of the remainder of the comparator circuit. This interference may either take the form of a "Up-Up Inhibit" or of a "Down-Down Inhibit" exerted by the respective points A. Figure 6 illustrates an "Up-Up Inhibit," while Figure 7 shows the situation of a "Down-Down Inhibit."

Turning first to Figure 6 with its "Up-Up Inhibit," it is assumed, in this case, that the shown memory tube stores a binary "zero," while the corresponding output line from the code generator transmits the signal for a binary "one." Accordingly, the tube is not ignited and, as a result, its anode potential is high or "up." The output line from the code generator carries, as a signal for a binary "one," a potential of plus 213 volts. Point A receives, therefore, a relatively high ("up") voltage both from the memory tube and from the code generator output line. This is what has been called the "Up-Up" condition. During this condition the potential at the corresponding A points is greater than 107 volts.

As far as line 160 and its associated connections are concerned, there is a current flow from plus 475 volts through the asymmetrical conductor 170 to plus 85 volts, thus putting line 160 at plus 85 volts. Due to the "Up-Up" condition, point A has a high potential which is higher than plus 157 volts. As a result, current flows both from the anode of the associated memory tube and from the output line from the code generator through point A, asymmetrical conductor E, point C and line 161 to minus 475 volts. It also flows from line 161 through asymmetrical conductor 172 to plus 157 volts, thus putting line 161 and point A at plus 157 volts. The voltage at the cathode of asymmetrical conductor D is, therefore, also at plus 157 volts, while its anode is at plus 85 volts in accordance with the potential of line 160. Under these conditions asymmetrical conductor D is cut off, and diode E is conducting.

The given situation does not permit any current flow through the primary section 151B. The anode of asymmetrical conductor 174 is at plus 85 volts, due to the voltage on line 160, while its anode has a potential which is larger than plus 85 volts, due to the condition of line 161. As a result, asymmetrical conductor 174 does not conduct, and no current flows through the primary section 151B. There is also no current flow through the primary section 151A, for the same reasons as in the case of Figure 5. No output signal emanates from the secondary 152.

Figure 7 exemplifies the operation in the case of a "Down-Down Inhibit." It is assumed, in this example, that the shown memory tube stores a binary "one" and is conducting, thus reducing its anode potential to approximately 60 volts. The code generator, in contrast thereto, signals a binary "zero" by leaving the corresponding output line at the base line potential of minus 90 volts. As a result of this "Down-Down" condition, point A shows a voltage of between plus 30 and plus 50 volts. This, in turn, produces a current flow from plus 475 volts through line 160, asymmetrical conductor D and point A to minus 90 volts. Turning now to line 161, there is a current flow from plus 107 volts through asymmetrical conductor 171 to minus 475 volts. This puts line 161 and the cathode of asymmetrical conductor E at plus 107 volts, while the anode of this asymmetrical conductor is at between plus 30 and plus 50 volts. Asymmetrical conductor E is cut off, therefore. There is also a current flow from DA through asymmetrical conductor 175 to minus 475 volts, thus putting the cathode of asymmetrical conductor 174 at plus 71 volts. The anode of this asymmetrical conductor is at between plus 30 and plus 50 volts, due to the condition of line 160. Asymmetrical conductor 174 is cut off, therefore. No current flows through primary section 151B, and no output signal emanates from the secondary 152. There is not enough current flow through the primary section 151A to produce an output signal in the secondary 152 since the difference in the potentials of the anode and the cathode of asymmetrical conductor 173 is very small.

Figures 3 to 7 inclusive have illustrated the operation of the circuit of Figure 2 in accordance with differing significant operating conditions, and how this one single circuit performs the double function of the "yes or no" probe and of the "detailed answer" probe, and wherein one single output line carries the signals resulting from either probe. The invention has been described and explained with the help of one specific embodiment. It is to be understood, however, that the invention is capable of various modifications and applications, not departing essentially from the spirit thereof, as will become apparent to those skilled in the art.

What is claimed is:

1. In combination, an electronic probing device comprising, a plurality of electronic units each of which has two different significant states, an equal plurality of signal lines adapted to receive signals of two different significant kinds, such kinds corresponding to said two different significant states, a first and a second common connecting line, an output circuit including a transformer the primary of which is center tapped, said first common connecting line being connected to said center tap of said primary, said second common connecting line being connected to one end of said primary, a plurality of junction points, means connecting every single one among said electronic units and a corresponding signal line to a respective junction point, means separately connecting each of said junction points to said first and to said second common connecting line, wherein said output circuit is conditioned to pass an output signal in response to predetermined signal conditions developed at any one of said junction points.

2. The combination according to claim 1 in which the means connecting said junction points to the first and second common connecting lines include first and second groups of asymmetrical conductors.

3. The combination according to claim 2 wherein the members of said first group and the members of said second group are connected through unlike electrodes to their respective junction point.

4. The combination according to claim 1 comprising a first probing signal input line and a second probing signal input line, wherein said first probing signal input line is connected to the junction of said second common connecting line and said one end of said primary, and said second probing signal input line is connected to the other end of said primary.

5. The combination according to claim 4 comprising, a first unilateral conductor positioned at said one end of said primary, and a second unilateral conductor positioned at said other end of said primary.

6. The combination according to claim 5 wherein said first and said second unilateral conductor are connected through unlike electrodes to said primary.

7. The combination according to claim 5 comprising a third unilateral conductor interposed between said first probing signal input line and said junction of said second common connecting line and of said one end of said primary.

8. The combination according to claim 7 wherein said first and said third unilateral conductor are connected through like electrodes to said junction.

9. The combination according to claim 4 comprising power supply terminals and clamping devices connected to said first and to said second common connecting line, each of said clamping devices including a voltage source and an asymmetrical conductor.

10. In combination, an electronic probing device comprising, a plurality of electronic units each of which has two different significant states, an equal plurality of signal lines adapted to receive signals of two different significant kinds, such kinds corresponding to said two different significant states, a first and a second common connecting line, a plurality of junction points, means connecting every single one among said electronic units and a corresponding signal line to a respective junction point, means separately connecting each of said junction points to said first and to said second common connecting line, an output circuit, a transformer the primary of which is center tapped as a part of said output circuit, said first common connecting line being connected to said center tap of said primary, said second common connecting line being connected to one end of said primary, a first probing signal input line and a second probing signal input line, said first probing signal input line being connected to the junction of said second common connecting line and said one end of said primary, and said second probing signal input line being connected to the other end of that primary, wherein a current flow through that section of said primary which lies between said center tap and said second probing signal input line is conditioned by the coincidence of a signal on said second probing signal input line, a predetermined second state of at least one unit in said plurality of electronic units, and a predetermined first kind of a signal in every one in said plurality of signal lines.

11. In combination, an electronic probing device comprising, a plurality of electronic units each of which has two different significant states, an equal plurality of signal lines adapted to receive signals of two different significant kinds, such kinds corresponding to said two different significant states, a first and a second common connecting line, a plurality of junction points, means connecting every single one among said electronic units and a corresponding signal line to a respective junction point, means separately connecting each of said junction points to said first and to said second common connecting line, an output circuit, a transformer the primary of which is center tapped as a part of said output circuit, said first common connecting line being connected to said center tap of said primary, said second common connecting line being connected to one end of said primary, a first probing signal input line and a second probing signal input line, said first probing signal input line being connected to the junction of said second common connecting line and said one end of said primary, and said second probing signal input line being connected to the other end of that primary, wherein a current flow through that section of said primary which lies between said center tap and said second common connecting line is conditioned by an individual coincidence within each pair among all said pairs of electronic units and corresponding signal lines so that a predetermined first state of any one among said units coincides with a predetermined first kind of a signal in its associated signal line, and a predetermined second state of any one among said units coincides with a predetermined second kind of a signal in its associated signal line, and by the coincidence of all these individual coincidences with a signal on said first probing signal input line.

12. In combination, an electronic probing device comprising, a plurality of electronic units each of which has two different significant states, an equal plurality of signal lines adapted to receive signals of two different significant kinds, such kinds corresponding to said two different significant states, a first and a second common connecting line, a plurality of junction points, means connecting every single one among said electronic units and a corresponding signal line to a respective junction point, means separately connecting each of said junction points to said first and to said second common connecting line, an output circuit, a transformer the primary of which is center tapped as a part of said output circuit, said first common connecting line being connected to said center tap of said primary, said second common connecting line being connected to one end of said primary, a first probing signal input line and a second probing signal input line, said first probing signal input line being connected to the junction of said second common connecting line and said one end of said primary, and said second probing signal input line being connected to the other end of that primary, wherein, within any pair among all said pairs of electronic units and corresponding signal lines, a coincidence of a relatively high voltage emanating from the unit in a pair and of a relatively high voltage in its associated signal line inhibits a current flow through that section of said primary which lies between said center tap and said second common connecting line.

13. In combination, an electronic probing device comprising, a plurality of electronic units each of which has two different significant states, an equal plurality of signal lines adapted to receive signals of two different significant kinds, such kinds corresponding to said two different significant states, a first and a second common connecting line, a plurality of junction points, means connecting every single one among said electronic units and a corresponding signal line to a respective junction point, means separately connecting each of said juncture points to said first and to said second common connecting line, an output circuit, a transformer the primary of which is center tapped as a part of said output circuit, said first common connecting line being connected to said center tap of said primary, said second common connecting line being connected to one end of said primary, a first probing signal input line and a second probing signal input line, said first probing signal input line being connected to the junction of said second common connecting line and said one end of said primary, and said second probing signal input line being connected to the other end of that primary, wherein, within any pair among all said pairs of electronic units and corresponding signal lines, a coincidence of a relatively low voltage emanating from the unit in a pair and of a relatively low voltage in its associated signal line inhibits a current flow through that section of said primary which lies between said center tap and said second common connecting line.

14. The combination according to claim 1 comprising, a first probing signal input line and a second probing signal input line, and asymmetrical conductors, wherein said first probing signal input line is connected to the junction of said second common connecting line and said one end of said primary, said second probing signal input line is connected to the other end of said primary, and said asymmetrical conductors are positioned at either end of said primary, interposed between any one of said junction points and said first common connecting line, and interposed between any one of said junction points and said second common connecting line.

15. The combination according to claim 14 comprising power supply terminals and clamping devices connected to said first and to said second common connecting line, each of said clamping devices including a voltage source and an asymmetrical conductor.

16. The combination according to claim 14 wherein a current flow through that section of said primary which lies between said center tap and said second probing signal input line is conditioned by the coincidence of a signal on said second probing signal input line, a predetermined second state of at least one unit in said plurality of electronic units, and a predetermined first kind of a signal in every one in said plurality of signal lines.

17. The combination according to claim 14 wherein a current flow through that section of said primary which lies between said center tap and said second common connecting line is conditioned by an individual coincidence within each pair among all said pairs of electronic units and corresponding signal lines so that a predetermined first state of any one among said units coincides with a predetermined first kind of a signal in its associated signal line, and a predetermined second state of any one among said units coincides with a predetermined second kind of a signal in its associated signal line, and by the coincidence of all these individual coincidences with a signal on said first probing signal input line.

18. The combination according to claim 14 wherein, within any pair among all said pairs of electronic units and corresponding signal lines, a coincidence of a relatively high voltage emanating from the unit in a pair and of a relatively high voltage in its associated signal line inhibits a current flow through that section of said primary which lies between said center tap and said second common connecting line.

19. The combination according to claim 14 wherein, within any pair among all said pairs of electronic units and corresponding signal lines, a coincidence of a relatively low voltage emanating from the unit in a pair and of a relatively low voltage in its associated signal line inhibits a current flow through that section of said primary which lies between said center tap and said second common connecting line.

References Cited in the file of this patent

UNITED STATES PATENTS

| | | |
|---|---|---|
| 2,610,243 | Burkhart et al. | Sept. 9, 1952 |
| 2,615,127 | Edwards | Oct. 21, 1952 |
| 2,641,696 | Woolard | June 9, 1953 |
| 2,730,676 | Barker | Jan. 10, 1956 |
| 2,752,489 | Aigrain | June 26, 1956 |